United States Patent [19]

Petcavich

[11] Patent Number: 4,876,428
[45] Date of Patent: Oct. 24, 1989

[54] TRAY OR PAN FOR BAKING BATTER-BASED FOOD PRODUCTS IN MICROWAVE OVENS

[76] Inventor: Robert J. Petcavich, 4816 Marborough St., San Diego, Calif. 92116

[21] Appl. No.: 271,537

[22] Filed: Nov. 15, 1988

Related U.S. Application Data

[62] Division of Ser. No. 89,508, Aug. 26, 1987.

[51] Int. Cl.$^4$ .............................................. H05B 6/80
[52] U.S. Cl. ...................... 219/10.55 E; 219/10.55 F; 426/243; 426/107; 99/DIG. 14
[58] Field of Search .................. 219/10.55 E, 10.55 F, 219/10.55 R; 426/234, 241, 243, 107, 113, 114, 115; 99/DIG. 14

[56] References Cited

U.S. PATENT DOCUMENTS

| | | | |
|---|---|---|---|
| 3,573,923 | 4/1971 | Meiser | 219/10.55 E X |
| 4,183,435 | 1/1980 | Thompson et al. | 219/10.55 E X |
| 4,558,198 | 12/1985 | Levendusky et al. | 219/10.55 E |
| 4,574,174 | 3/1986 | McGonigle | 219/10.55 E X |

FOREIGN PATENT DOCUMENTS

1215369 12/1970 United Kingdom ........ 219/10.55 A

Primary Examiner—Philip H. Leung
Attorney, Agent, or Firm—Juettner Pyle Lloyd & Verbeck

[57] ABSTRACT

Batter-based baked goods, such as brownies, are produced by subjecting a microwave-transparent pan containing unbaked and non-frozen batter to microwave energy in a microwave oven. The oven has a klystron transmitting energy at a frequency having a wave length, in inches, equal to λ. The pan, which is free of sharp corners, has bottom and side walls and an open top for receiving the batter, and has its bottom wall and thus the batter spaced apart from the interior bottom wall of the oven by a microwave transparent spacer means. The bottom and side walls confine the batter in the pan to predetermined height, width and length dimensions such that each dimension is a multiple of the quarter wavelength λ/4 of the frequency of the microwave energy applied to the batter; preferably such that one dimension, in inches, is a λ/4, where A is an odd integer from 1 to 15, another one of the dimensions is B λ/4 where B is an even integer from 2 to 12, and the remaining dimension is C λ/4 wherein C is either an odd integer from 1 to 15 or an even integer from 2 to 12.

7 Claims, 1 Drawing Sheet

TRAY OR PAN FOR BAKING BATTER-BASED FOOD PRODUCTS IN MICROWAVE OVENS

This is a divisional of co-pending application Ser. No. 089,508 filed on 8/26/87.

TECHNICAL FIELD

The present invention relates to a method and a container such as a tray or pan for preparing batter-based baked goods, such as Brownies, in a microwave oven.

BACKGROUND ART

Among the myriad of baked goods favored by the American palate are those known, generally, as Brownies. Organoleptically, the ideal Brownie has a chewy, moist texture, a smooth, uniform surface appearance and is free of hard spots, unbaked batter, and a cratered surface. For the homemaker, there are available numerous "Brownie dry mixes". These, when admixed with, e.g. oil, water, and egg to form a batter, spread in a pan and baked in a gas or electric oven, then cut into rectangles, become the delicious snack cakes known as Brownies.

With the advent and increasing popularity and use of microwave ovens, there has been an increase in the availability and variety of prepackaged food products, including cake mixes, which are designed especially for heating and cooking in a microwave oven. While many foods lend themselves well to heating in a microwave oven to produce a satisfactorily cooked product, this is not true of all foods. Among foods which have presented problems in that regard, are batter-based baked goods, and in particular those known as Brownies.

Attempts to produce Brownies, having a desirable taste and eye-appeal by heating a pan of Brownie batter in a microwave oven have, hitherto, not been successful, the resulting baked product frequently having burned edges, having portions which are hard to the "bite", soupy, uncooked portion therewithin, and cratering or pitting of the surface, all of these affecting the taste appeal or the asthetics of the product.

The production of satisfactory Brownies by means of heating a batter in a microwave oven has thus far remained an elusive goal.

DISCLOSURE OF THE INVENTION

It is a primary object of this invention to provide a new and unique method and container for use in producing Brownies and similar baked products, by heating a batter-containing pan in a microwave oven.

Another object is to produce Brownies which are substantially free of burned edges, uncooked, soupy inner portions, uneven surfaces, cratering, and pitting, by subjecting a brownie cake batter in a tray or pan, to microwave energy in a microwave oven.

A still further object is to provide a unique container for use as a tray or pan for holding a batch of cake batter, such as Brownie cake batter, while container and batter are subjected to microwave energy in a microwave oven.

Yet a further object is to provide a means for minimizing or eliminating soft and incompletely baked interior portions of Brownie cake which has been baked in a microwave oven.

These and other more specific objects of the invention will be understood from the following brief description of the drawings, and of the best mode for carrying out the invention.

SUMMARY OF THE INVENTION

Figure 1:
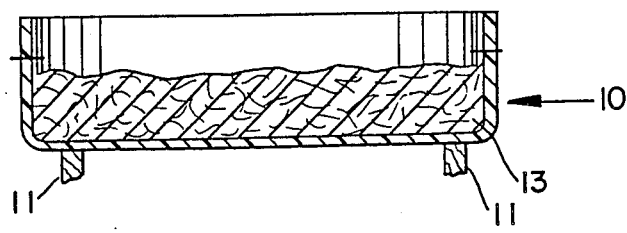
FIG. 1 is a vertical sectional view of one form of a pan designed in accordance with the invention.

My invention provides a unique method and container, for batter-based production of bakery goods, and in particular Brownies, by heating Brownie batter contained in a unique pan, or tray, in a microwave oven.

In producing Brownies in accordance with my invention, one first forms a batter from any commercially available Brownie dry mix and pours the resulting batter into the specially designed and dimensioned microwave transparent pan, to a predetermined depth. The pan, which may have extenders, or legs, integral therewith to provide a free or open space between the bottom of the pan and the bottom of the oven is placed in a microwave oven, such as one of those conventional ovens operating at 2.45 gigahertz, and subjecting the microwave energy transmission into the batter for a time sufficient to bake the pan contents, as by using a power setting of "high" for about 4 minutes.

In place of a pan having extenders integral therewith, the pan may be wholly flat-bottomed; however in such case it is desirable to insert a microwave-transparent spacer between the bottom of the pan and the bottom of the oven, that is to say the false bottom of the oven. The pan is formed of a microwave transparent polymeric material, such as a polyolefin, including polypropylene, polyesters, polycarbonates, polystyrene, polyamide imides, polyether imides, polyvinyl chlorides, or blends of these. Desirably, the materials used should be those that provide good release properties, be low in cost, and be able to withstand temperatures in excess of 130 degrees C. The pan is made in any suitable way, as by thermomolding, and formed so it is rectangular or oval in shape, with generous corner radii and with no angular corners. The walls of the pan are generally less than about 0.060 inches, and preferably about 0.02 to 0.03 inches, in thickness.

The substantially critical dimensions of the pan are expressible in terms of wavelength $\lambda$ of the applied microwave radiation. Thus, the depth of the pan in inches should be preferably about $N \lambda/4$, where N is an odd integer from 1 to 15. The width of the pan should preferably be about $N \lambda/4$, where N is an even integer from 2 to 12. The length of the pan should preferably be about $N \lambda/4$, where N is an odd integer from 1 to 15.

More broadly expressed, when one dimension, height(h), width(w) or length(l) of the pan 10, in inches, is $N \lambda/4$, N being an odd integer from 1 to 15, then one of the other dimensions is $N \lambda/4$, N being an even integer from 2 to 12, and the remaining dimension is $N \lambda/4$ N being either an odd integer from 1 to 15 or an even integer from 2 to 12.

Since the operating frequency for a standard home oven is 2.45 gigahertz, the wavelength is 4.8 inches, and the 1/4 wavelength is 1.2 inches. Translating the foregoing into one set of dimension expressed in inches, a convenient pan size, for the practice of my invention, is one with the following dimensions: Depth about 1.2 inches; width, no greater than about 4 inches; length, no greater than about 6 inches.

When used with a batter formed from a commercially available dry mix such as the Fudge Brownie Mix produced by General Mills, Inc. of Minneapolis, Minnesota, and a pan of the aforesaid dimensions, the batter depth, in the pan is preferably less than about 0.60 inches, and preferably not over about 1.2 inches in thickness.

When a thermal spacer is used to separate the bottom of the pan from the bottom of the oven, it should be from about 0.01 to about 0.50 inches thick. The spacer, on which the pan can be rested, in the oven, is formed of a microwave transparent material such as foamed polyethylene, foamed polyvinyl chloride, foamed polypropylene, foamed polycarbonate, corrugated cardboard, embossed polymeric film, polymeric filament net, or the like, and should be able to maintain its physical integrity at a temperature greater than about 130 degrees C. In this connection I have also successfully used mats of the type commonly utilized as scouring pads and which are about ⅛ inch thick and made of nylon threads or filaments. The other dimensions of the spacer are preferably coextensive with the length and width of the pan.

A release-coated perforated lid of microwave transparent material, such as paperboard, may be placed on top of the batter-containing pan before it is placed in the oven, to further minimize cratering or pitting of the resulting cake surface due to release of gases during baking. Typical release-coating materials are vegetable oils, silicones or fluoro compounds.

BEST MODE FOR CARRYING OUT THE INVENTION

Referring now to the drawings, wherein like numbers refer to like parts, FIG. 1 illustrates one form of a pan embodying, and used in carrying out the method of, the invention. The pan 10 is formed of a microwave transparent polymeric material, such as polyolefin, including polypropylene, polyesters, polycarbonates, polystyrene, polyvinyl chlorides, polyether imides, polyamide imides or mixtures thereof, in a shape such as oval or near rectangular, so that there are no sharp, angular corners. Extenders or legs 22, 3 or more in number, which may be formed integrally with, and of the same material as, the pan 10, or otherwise suitably joined thereto, are of a length such as to extend from about 0.01 to about 0.50 inches below the bottom of pan 10, and, in use, rest on the false bottom of a conventional microwave oven (not shown), operating at 2.45 gigahertz.

Figure 2:
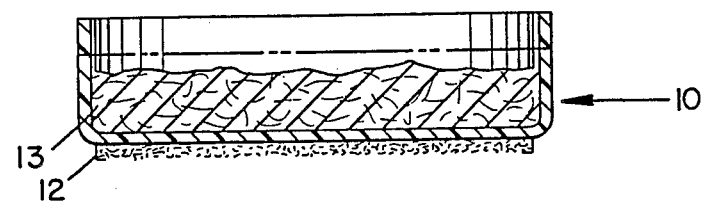
FIG. 2 is a vertical sectional view of a different form of a pan, and different separator means for use therewith in accordance with the invention.

In place of legs or extenders 11, and as shown in FIG. 2, the pan may have suitably joined thereto a spacer 12, formed of microwave transparent material such as the previously described foamed plastics, or the like, of a thickness such as to effect a separation between the bottom of pan 10 and the false bottom of the microwave oven (not shown) by about 0.10 to 0.50 inches. Of course, the spacer 12 need not necessarily be joined to pan 10, but may be a separate unit on which the pan 10 rests when in the oven.

Figure 3:
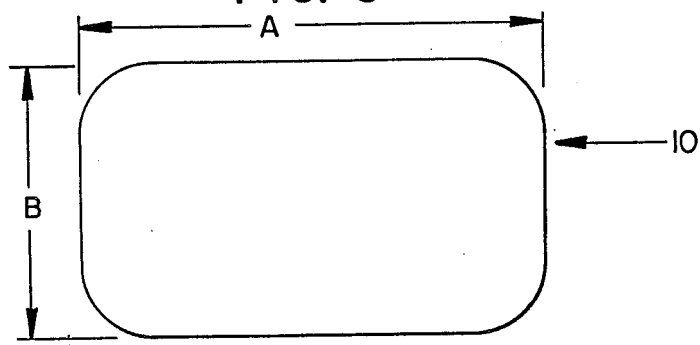
FIG. 3 is a plan view of the pan of FIGS. 1 and 2.

Pan 10, which must be essentially free of sharp corners, may be oval in shape or generally rectangular, as shown in FIG. 3, and may vary in overall size. However, the relative dimensions are substantially those described above in terms of the wavelength of the microwave radiation applied to the pan 10 and contents, in a microwave oven, when heating Brownie mix batter contained in the pan 10.

By way of further illustration, in producing Brownies in accordance with my invention, a batter was prepared by mixing 225 grams of Brownie mix such as the fudge Brownie mix manufactured by General Mills, Inc. of Minneapolis, Minnesota, with 60 grams of water, i.e., a ratio of grams of mix to grams of water of 3.75. The dry mix was placed in a bowl, and 60 grams of hot tap water added. Using a fork, the mix was completely wetted, stirred for 1 minute, and then poured into pan 10, thermo-formed of polypropylene, having a thickness of 0.030 inches, a length of 6 inches, as shown by A, a width of 3.6 inches as shown by B, both of FIG. 3, and a depth of 1.2 inches as shown in FIG. 1. The thickness of the batter 13 in pan 10 was 0.60 inches. The pan 10 and batter 13 contained therein, were then placed in a 750 watt microwave oven operating at 2.45 gigahertz, with the extenders 11 of pan 10 resting on the false bottom of the oven, the power set on "high" for 4 minutes, and the pan and contents then removed from the oven. On cooling, the resulting cake, which was found to be essentially free of burnt edges, cratering or pitting, and was evenly baked throughout with no semi-liquid "soupy" unbaked batter, was cut into rectangles. The resulting Brownies were chewy, moist, and delicious.

While the invention has been described in terms of preferred embodiments, the appended claims are intended to encompass all embodiments which fall within the spirit of the invention. Thus, while my invention is particularly applicable to production of Brownies, it will also lend itself to the production of other batter-based baked goods from, for example, muffin batter, cake batter and cookie batter, including frozen batters.

I claim:

1. In combination:
    a microwave transparent open top pan having bottom and side walls substantially free of sharp corners;
    a non-frozen, unbaked batter of batter-based food product in said pan;
    a microwave oven within which the batter containing pan is supported for baking of said batter,
    said microwave oven having an interior bottom wall supporting the batter containing pan and klystron for applying microwave energy to the batter in said pan at frequency having a wavelength in inches equal to $\lambda$;
    said bottom and side walls of said pan confining the batter in said pan within predetermined length, width and depth demensions, each of which dimensions is a multiple of a quarter wavelength $\lambda/4$ of the applied microwave energy; and
    microwave transparent thermal spacer means between the bottom wall of said oven and the bottom of said pan for spacing the batter in the pan from the interior wall of the oven.

2. The combination of claim 1 wherein one of said dimensions is equal to a $\lambda/4$ where A is an off integer from 1 to 15, a second one of said dimensions is equal to B $\lambda/4$ where B is an even integer from 2 to 12, and the third one of said dimensions is equal to C $\lambda/4$ where C is either an odd integer from 1 to 15 or an even integer from 2 to 12.

3. The combination of claim 2, wherein said one dimension comprises the depth of the batter in the pan, said second dimension comprises the width of the batter in the pan, and said third dimension comprises the length of the batter in the pan.

4. The combination of claim 1, wherein said spacer means separates the bottom wall of said pan from the bottom wall of said oven by a dimension of about 0.01 to 0.50 inch.

5. The combination of claim 1, wherein said spacer means is formed integrally with said pan.

6. The combination of claim 1, wherein said spacer means is formed integrally with said pan and separates the bottom wall of the pan from the bottom wall of said oven by a dimension in the order of about ⅛ inch.

7. The combination of claim 1, including a release coated, microwave transparent, perforated lid placed on top of the batter containing pan.

* * * * *